(12) United States Patent
Salesman et al.

(10) Patent No.: US 10,320,250 B2
(45) Date of Patent: Jun. 11, 2019

(54) PERMANENT MAGNET MOTOR WITH COUNTERBALANCING WEIGHTS, SHAFT, AND ROTOR

(71) Applicant: TRANE INTERNATIONAL INC., Piscataway, NJ (US)

(72) Inventors: Aaron Salesman, Viroqua, WI (US); Eric Steven Mlsna, Cashton, WI (US); Chris Wehrenberg, La Crosse, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 432 days.

(21) Appl. No.: 14/678,792

(22) Filed: Apr. 3, 2015

(65) Prior Publication Data

US 2015/0288234 A1 Oct. 8, 2015

Related U.S. Application Data

(60) Provisional application No. 61/974,892, filed on Apr. 3, 2014.

(51) Int. Cl.
*H02K 1/28* (2006.01)
*H02K 1/27* (2006.01)
(Continued)

(52) U.S. Cl.
CPC ............. *H02K 1/28* (2013.01); *F04C 23/008* (2013.01); *F04C 29/0085* (2013.01);
(Continued)

(58) Field of Classification Search
CPC .......... H02K 1/277; H02K 1/276; H02K 7/04; H02K 1/28; F04C 2240/60;
(Continued)

(56) References Cited

U.S. PATENT DOCUMENTS

| 4,144,469 A | 3/1979 | Miyashita et al. |
| 4,403,161 A | 9/1983 | Miyashita et al. |

(Continued)

FOREIGN PATENT DOCUMENTS

| CN | 101210560 A | 7/2008 |
| CN | 101368564 A | 2/2009 |

(Continued)

OTHER PUBLICATIONS

JP 04191486 English Translation.*

(Continued)

*Primary Examiner* — Bernard Rojas
*Assistant Examiner* — Maged M Almawri
(74) *Attorney, Agent, or Firm* — Hamre, Schumann, Mueller & Larson, P.C.

(57) ABSTRACT

Methods and systems to mount a shaft with a motor rotor are provided. The motor may include a plurality of permanent magnets embedded in a lamination stack of a rotor of the motor, which may run through the length of the lamination stack. The motor can include a shaft that may be coupled to the rotor in a center bore of the rotor. The shaft may be coupled to the rotor with a keyway. The shaft may be coupled to the rotor with a press fit. The shaft may be coupled to the rotor with a cold shrink fit. The motor may include a counter weight disposed on the shaft. The counter weight may help retain the shaft on the rotor. The embodiments as disclosed herein can help couple the shaft and rotor without using heat that may demagnetize the permanent magnets.

17 Claims, 9 Drawing Sheets

(51) Int. Cl.
*F04C 29/00* (2006.01)
*H02K 7/04* (2006.01)
*F04C 23/00* (2006.01)
*F04C 18/02* (2006.01)

(52) U.S. Cl.
CPC .............. *H02K 1/272* (2013.01); *H02K 7/04* (2013.01); *F04C 18/0215* (2013.01); *F04C 2230/60* (2013.01); *F04C 2240/60* (2013.01); *H02K 1/276* (2013.01)

(58) Field of Classification Search
CPC  F04C 2230/60; F04C 18/0215; F04C 23/008; F04C 29/0085; F04C 2240/807
USPC .............. 417/410.5; 310/156.09, 156.13, 51, 310/216.113–216.125
See application file for complete search history.

(56) References Cited

U.S. PATENT DOCUMENTS

| | | | |
|---|---|---|---|
| 4,469,970 A | 9/1984 | Neumann | |
| 4,568,846 A * | 2/1986 | Kapadia | H02K 1/2773 310/156.83 |
| 4,762,478 A | 8/1988 | Sakurai et al. | |
| 4,795,936 A * | 1/1989 | Crosetto | H02K 1/278 310/156.31 |
| 4,888,866 A * | 12/1989 | Hansen | H02K 1/26 29/598 |
| 5,097,166 A | 3/1992 | Mikulic | |
| 5,285,496 A * | 2/1994 | Frank | G08B 5/229 340/7.21 |
| 5,336,060 A * | 8/1994 | Tomell | F04C 23/008 184/6.18 |
| 5,463,262 A | 10/1995 | Uchida | |
| 5,666,015 A * | 9/1997 | Uchibori | H02K 1/276 310/156.53 |
| 5,683,236 A | 11/1997 | Harrison et al. | |
| 5,772,411 A | 6/1998 | Crum et al. | |
| 6,291,920 B1 * | 9/2001 | Miller | F16F 15/28 310/261.1 |
| 6,540,489 B1 * | 4/2003 | Higashiyama | F04C 18/0215 417/410.1 |
| 6,585,496 B1 * | 7/2003 | Sun | F04C 23/008 184/6.16 |
| 6,707,216 B2 | 3/2004 | Han et al. | |
| 6,727,627 B1 * | 4/2004 | Sasaki | H02K 1/276 310/156.53 |
| 6,954,018 B2 | 10/2005 | Kim et al. | |
| 7,183,685 B2 | 2/2007 | Weihrauch | |
| 7,415,756 B2 * | 8/2008 | Ishida | F04B 35/04 29/596 |
| 7,435,067 B2 * | 10/2008 | Doepker | F04C 29/0021 417/410.5 |
| 7,453,181 B2 | 11/2008 | Kikuchi et al. | |
| 7,612,481 B2 | 11/2009 | Weihrauch et al. | |
| 7,878,775 B2 | 2/2011 | Duppert et al. | |
| 7,923,881 B2 * | 4/2011 | Ionel | H02K 1/276 310/156.53 |
| 8,262,373 B2 * | 9/2012 | Reynolds | H01R 13/639 174/100 |
| 2006/0133944 A1 * | 6/2006 | Doepker | F04C 29/0021 418/55.1 |
| 2007/0138893 A1 | 6/2007 | Son | |
| 2007/0138894 A1 | 6/2007 | Shin | |
| 2010/0150752 A1 * | 6/2010 | Nakamura | F04C 23/008 417/410.5 |
| 2010/0301698 A1 * | 12/2010 | Goto | H02K 1/30 310/211 |
| 2012/0082573 A1 * | 4/2012 | Fargo | H02K 1/223 417/410.1 |
| 2013/0154426 A1 | 6/2013 | Melfi et al. | |
| 2013/0248022 A1 * | 9/2013 | Roof | F04C 23/008 137/544 |
| 2014/0021821 A1 | 1/2014 | Jensen | |
| 2014/0265704 A1 | 9/2014 | Rhyu et al. | |
| 2015/0200579 A1 * | 7/2015 | Seo | H02K 7/04 310/43 |

FOREIGN PATENT DOCUMENTS

| | | |
|---|---|---|
| CN | 102235354 A | 11/2011 |
| CN | 103827496 A | 5/2014 |
| JP | 60-006092 | 1/1985 |
| JP | 04191486 A * | 7/1992 |
| JP | 11-247780 A | 9/1999 |
| KR | 10-2013-0094658 A | 8/2013 |

OTHER PUBLICATIONS

International Search Report and Written Opinion for International Application PCT/US2015/024354, dated Jul. 16, 2015, 14 pgs.
Kenji Tojo, et al., "Development of High Efficiency Scroll Compressor with MS Motor", International Compressor Engineering Conference, paper 1904, Jul. 2008, 10 pgs.
Takekazu Obitani, et al., "Development of Highly Efficient Compressor Series Driven by IPM Motors", International Compressor Engineering Conference, Paper 1433, Jul. 2000, 9 pgs.
Mistubishi Electric ADVANCE: Motor Technologies for Industry and Daily Life Edition, vol. 103, Sep. 2003, 32pgs.
Meng Zhang et al., "A Speed Fluctuation Reducing Method for Sensorless PMSM-Compressor System in Air-Conditioners", Industrial Electronics Society, 2005. IECON 2005. 31st Annual Conference of IEEE, pp. 1861-1864 (citation information found at http://ieeexplore.ieee.org/xpl/login.jsp?tp=&arnumber=1575081&url=http%3A%2F%2Fieeexplore.ieee.org%2Fxpls%2Fabs_all.jsp%3Farnumber%3D1575081 ).
M. Igata et al., "High Efficiency Hermetic Compressor Operated by IPM Motor and Inverter System", International Compressor Engineering Conference, 1998, 8 pgs.

\* cited by examiner

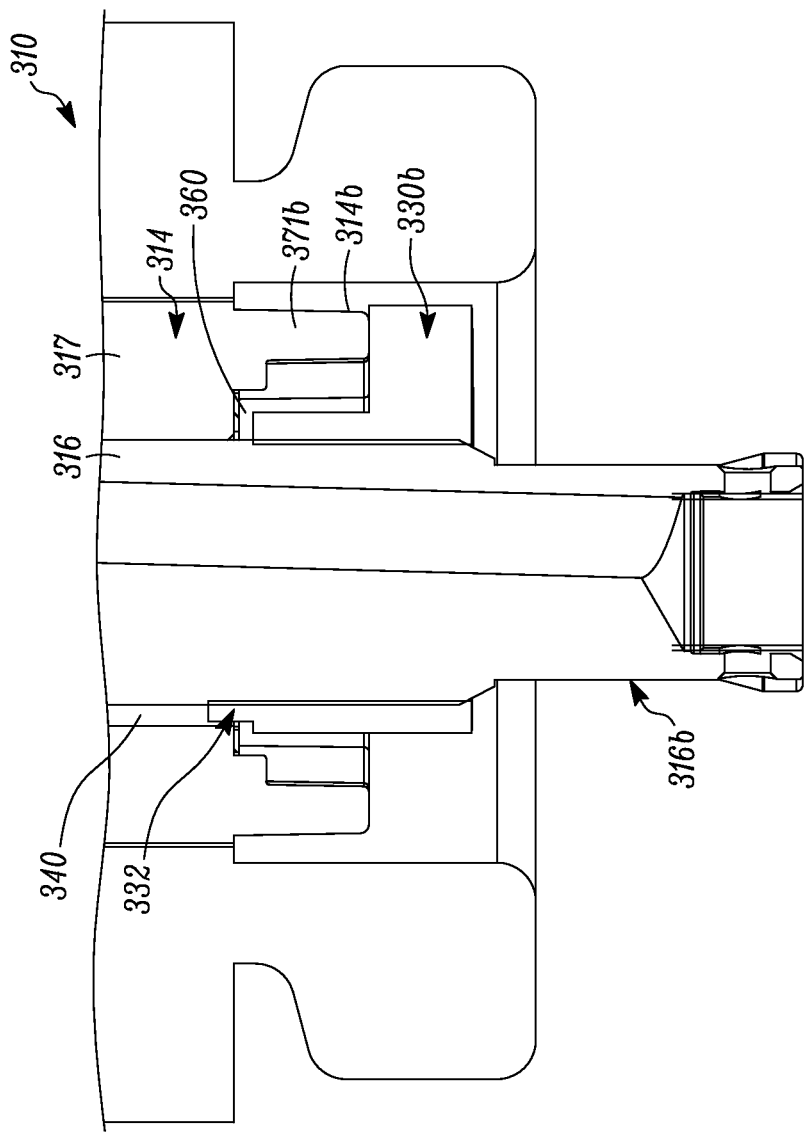

PERMANENT MAGNET MOTOR WITH COUNTERBALANCING WEIGHTS, SHAFT, AND ROTOR

FIELD

The disclosure herein relates to a motor of, for example, a compressor in a heating, ventilation and air conditioning (HVAC) system. More specifically, the disclosure herein relates to a motor including one or more permanent magnets.

BACKGROUND

A HVAC system often uses a compressor to compress the refrigerant. The compressor can be coupled to a motor, for example an electric motor. Typically, an electric motor may include a stationary stator and a rotatable rotor. The rotor can be coupled to the shaft so that a torque generated by the stator and the rotor can be transmitted from the rotor to the shaft, which can then drive the compressor.

SUMMARY

A motor can be coupled to a compressor, such as a scroll compressor, to drive a compressing mechanism. The embodiments herein are directed to a motor with one or more permanent magnets embedded in a lamination stack of a rotor of the motor. The embodiments as disclosed herein also provide methods and systems configured to help couple a shaft to the rotor without using heat that may demagnetize the permanent magnets in the motor.

In some embodiments, the motor may include a rotor with a lamination stack portion. A plurality of permanent magnets may be embedded in the lamination stack portion of the rotor. In some embodiments, the neighboring permanent magnets of the plurality of permanent magnets can be arranged relative to each from end to end to more or less than about 90 degrees.

The motor may also include a shaft that is coupled to the rotor, so that the rotor can transmit torque to the shaft. In some embodiments, the shaft may be coupled to the rotor in a center bore of the rotor.

In some embodiments, the shaft and the center bore of the rotor may have a press fit. In some embodiments, the shaft may have a diameter that is larger than the diameter of the center bore and the shaft may be shrink-fitted into the center bore.

In some embodiments, the center bore may have a key way and the shaft may have a key. The key may be fitted in the key way.

In some embodiments, the motor may include a counter weight disposed on the shaft. In some embodiments, the counter weight may have a press fit with the shaft. In some embodiments, the center bore of the rotor may have a shoulder and the shaft may have a step. In some embodiments, the step may rest on the shoulder of the center bore. In some embodiments, the counter weight and the step may be positioned at opposite ends of the center bore. In some embodiments, the step and the counter weight may help retain the shaft in the center bore of the rotor.

In some embodiments, the counter weight may have an alignment tab that may be positioned in the key way. The alignment tab may help align the counter weight relative to the shaft.

In some embodiments, the counter weight may be separated from the permanent magnets by a space. In some embodiments, the permanent magnets and the counter weight may be separated by a separation sheet.

Other features and aspects of the embodiments will become apparent by consideration of the following detailed description and accompanying drawings.

BRIEF DESCRIPTION OF THE DRAWINGS

Reference is now made to the drawings in which like reference numbers represent corresponding parts throughout.

FIGS. 3A to 3E illustrate aspects of a motor, according to another embodiment. FIG. 3A is a cross section view. FIG. 3B is an end view. FIG. 3C illustrates a counter weight. FIG. 3D illustrates a cross section view of a rotor. FIG. 3E illustrates an enlarged view of one end of the motor.

FIG. 5A illustrates directions of magnetic fluxes relative to a rotor. FIG. 5B illustrates a schematic arrangement of permanent magnets relative to a rotor in a two pole permanent magnet motor.

DETAILED DESCRIPTION

A compressor, such as may be used in a HVAC system, may be driven by a motor. Generally, an electric motor may include a stationary stator and a rotatable rotor. In operation, magnetic fields generated by the stator and the rotor can interact with each other to generate a torque. The torque generated by the electric motor can be transmitted from the rotor to the compressor through a shaft that is retained within the rotor. It is desirable to increase the efficiency of the electric motor so that the efficiency of the HVAC system may be increased.

An electric motor generally includes a stator and a rotor. The stator is generally stationary and the rotor can generally rotate. In operation, the stator can provide a changing magnetic field, which results in a torque between the stator and the rotor. One type of electric motor is a line starting motor. A line starting motor generally refers to a type of electric motor that is capable of starting from standstill and accelerating to the rated speed when fed with a constant amplitude and constant frequency voltage. One or more permanent magnets can be embedded into the rotor, which may increase the efficiency of line starting motor. A line starting motor with one or more permanent magnets embedded in the rotor is generally referred as a line starting permanent motor (LSPM).

Embodiments as disclosed herein are generally related to a motor (e.g. LSPM) that can be coupled to a compressor so as to drive a compressor. In some embodiments, the compressor can be a scroll compressor. In some embodiments, the compressor can be a screw compressor or other types of compressors. In some embodiments, the motor as described herein may include a plurality of permanent magnets embedded in a lamination stack of a rotor of the motor. In some embodiments, the permanent magnets run through the length of the lamination stack of the rotor. The motor can include a shaft that may be coupled to the rotor in a center bore of the rotor. In some embodiments, the shaft may be coupled to the rotor with a keyway. In some embodiments, the shaft may be coupled to the rotor with a press fit. In some embodiments, the shaft may be coupled to the rotor with a cold shrink fit. In some embodiments, the motor may include a counter weight disposed on the shaft. In some embodiments, the counter weight may help retain the shaft on the rotor. The embodiments as disclosed herein can help couple the shaft and rotor without using heat that may demagnetize the permanent magnets. A compressor with a motor as disclosed herein can help increase efficiency of the compressor.

References are made to the accompanying drawings that form a part hereof, and in which is shown by way of illustration of the embodiments in which the embodiments may be practiced. It is to be understood that the terms used herein are for the purpose of describing the figures and embodiments and should not be regarded as limiting the scope of the present application.

Figure 1:
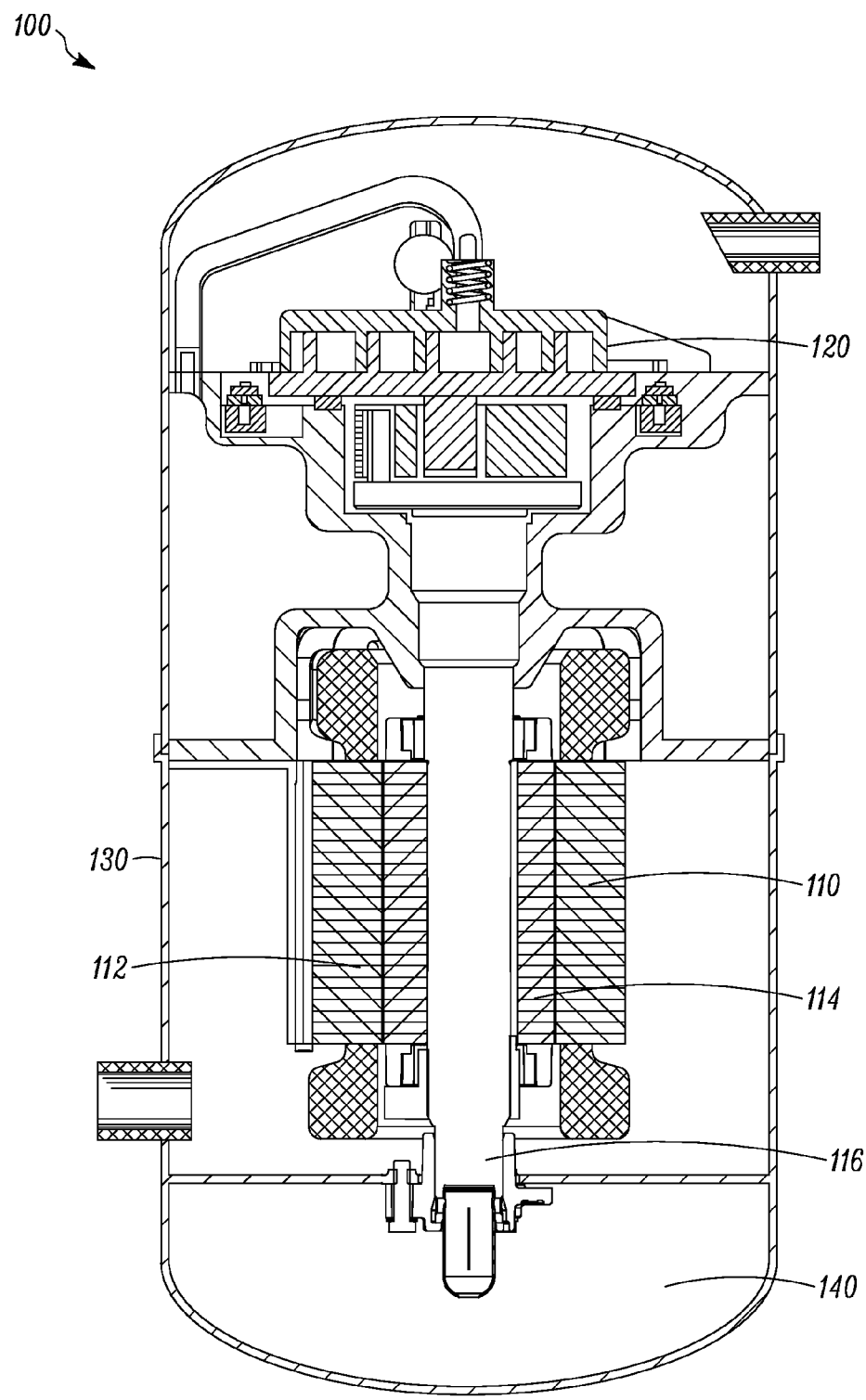
FIG. 1 illustrates a scroll compressor with a motor.

FIG. 1 illustrates a scroll compressor 100 that includes a motor 110 and a scroll 120. The motor 110 includes a stator 112 and a rotor 114. The rotor 114 is coupled to a shaft 116. The shaft 116 is coupled to the scroll 120. The motor 110 can be housed in a housing 130 of the compressor 100.

In operation, the motor 110 can create a torque between the rotor 114 and the stator 112. The torque can be transmitted to the shaft 116 that is coupled to the rotor 114, which in turn drives an orbital motion of the scroll 120. When refrigerant flows through the scroll 120, the orbital motion of the scroll 120 can compress the refrigerant. The shaft 116 can also include an oil pick up passage (not shown in FIG. 1 but see e.g. oil pick up passage 220 in FIG. 2 for example) to direct oil 140 from a bottom of the housing 130 to, for example, the scroll 120.

It is to be appreciated that the embodiment as illustrated in FIG. 1 is exemplary, and the motor 110 can also be used with other types of compressor, such as a screw compressor.

A permanent magnet used in the motor 100 can be demagnetized by, for example, heat. Therefore, it is not desirable to use heat to expand, for example, the rotor 114 when mounting the shaft 116 with the rotor 114. FIGS. 2, 3A to 3C are directed to embodiments that may help retain a shaft (e.g. the shaft 116 in FIG. 1) to a rotor (e.g. the rotor 114 in FIG. 1) without using heat to expand the rotor. Generally, the embodiments as disclosed herein include retaining the rotor and the shaft with a press fit and/or a key way. The embodiments as disclosed herein can also include using a counter weight to help retain the shaft to the rotor.

Figure 2:
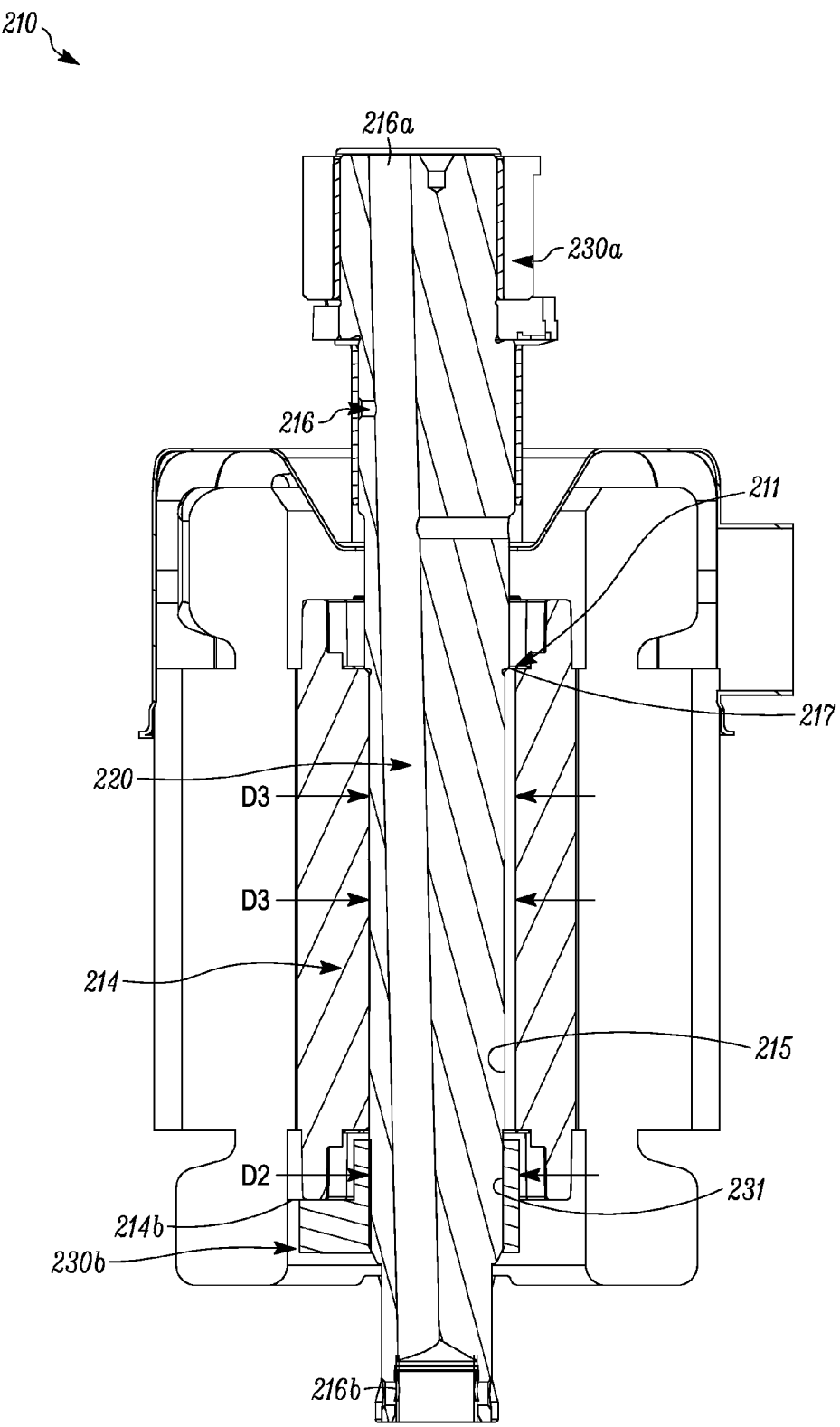
FIG. 2 illustrates a cross section view of a motor, according to one embodiment.

FIG. 2 illustrates a cross section of a motor 210 that includes a shaft 216 and a rotor 214. The shaft 216 can include an oil pick-up passage 220. When the motor 210 is used with, for example, a scroll compressor (e.g. the scroll compressor 100 in FIG. 1), the oil pick-up passage 220 can be configured to direct oil (e.g. the oil 140 in FIG. 1) to the scroll (e.g. the scroll 120 in FIG. 1).

The shaft 216 can be retained within the rotor 214 with a press fit. The term "press fit" generally means that a diameter D2 of the shaft 216 is larger than a diameter D3 of a center bore 215 of the rotor 214, so that forces may be needed to fit the shaft 216 into the center bore 215. After the shaft 216 is inserted into the center bore 215 of the rotor 214, the press fit between the shaft 216 and the center bore 215 can provide a friction to transmit a torque from the rotor 214 to the shaft 216.

In some embodiments, the shaft 216 and the center bore 215 can have a slip fit. The term "slip fit" is a type of fit and generally means that the diameter D2 of the shaft 216 is the same or smaller than the diameter D3 of the center bore 215, so that the shaft 216 can be fitted into the center bore 215 relatively easily.

In some embodiment, the diameter D2 of the shaft 216 can be shrunk with, for example, a cold temperature. For example, the shaft 216 can be immersed into liquid nitrogen to shrink the diameter D2 of the shaft 216. In some embodiments, after cold shrinkage, the diameter D2 of the shaft 216 may be smaller than the diameter D3 of center bore 215. The cold shrinkage can help fit the shaft 216 into the center bore 215. When the shaft 216 returns to a normal temperature, such as the room temperature, the shaft 216 and the center bore 215 can form e.g. a press fit.

The shaft 216 can also include one or more counter weights 230a and 230b. The counter weights 230a and 230b can be fitted to the shaft 216 proximate a first end 216a and a second end 216b of the shaft 216 respectively. In the orientation as shown in FIG. 2, the motor 210 is positioned in a vertical orientation. The first counter weight 230a can be fitted to the shaft 216 from the upper end of the motor 210, and the second weight 230b can be fitted to the shaft 216 from the lower end of motor 210 in the vertical orientation as shown in FIG. 2.

The shaft 216 can include a step 217 and the rotor 214 can include a shoulder 211. When the shaft 216 is fitted into the center bore 215 of the rotor 214 from the upper side in the vertical orientation, the shaft 216 can be pushed into the center bore 215 until the step 217 may rest on the shoulder 211. After the shaft 216 is fitted into the center bore 215 until the step 217 rests on the shoulder 211, the second counter weight 230b can be fitted to the shaft 216 from the lower end of the motor 210. The second counter weight 230b may have an opening 231, through which the shaft 216 can fit. The opening 231 and the shaft 216 may form a press fit.

The second counter weight 230b can be pushed along the shaft 216 until it rests on an end 214b of the rotor 214. The contact between the shoulder 211 and the step 217 and/or the press fit between the second counter weight 230b and the rotor 214 can help retain the shaft 216 inside the center bore 215. More particularly, the contact between the shoulder 211 and the step 217 and/or the press fit between the second counter weight 230b and the rotor 214 can help prevent the shaft 216 from sliding relative to the vertical orientation inside the center bore 215.

The first counter weight 230a can be fitted to the shaft 216 from the upper end of the motor 210. The first and second counter weights 230a and 230b can help balance the shaft 216 when the shaft 216 rotates.

Figure 3A:
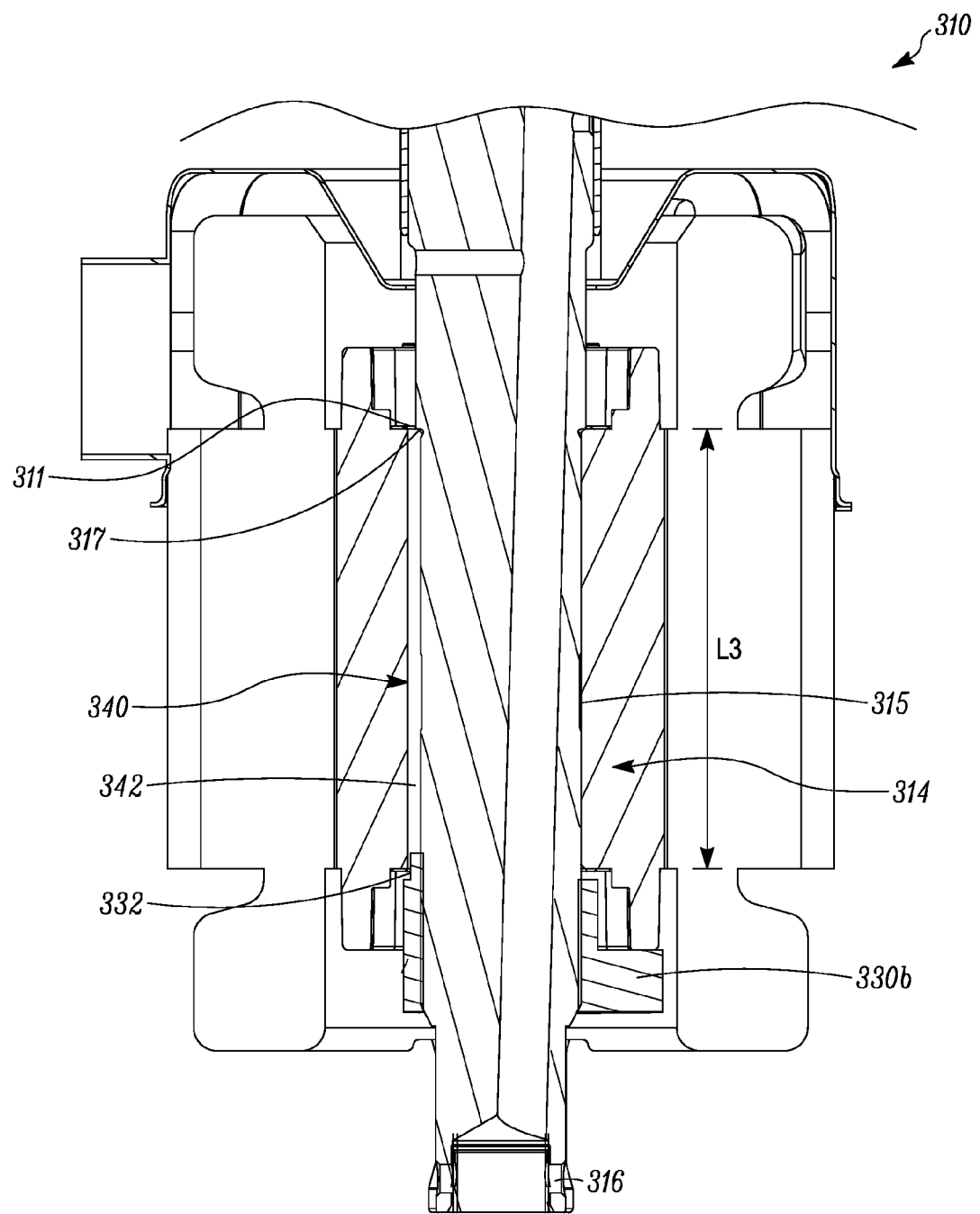

FIGS. 3A to 3D illustrate another embodiment of motor 310. Referring to FIG. 3A, the motor 310 includes a shaft 316 and a rotor 314. The rotor 314 may include a keyway 340, in which a key 342 of the shaft 316 can fit.

Figure 3B:
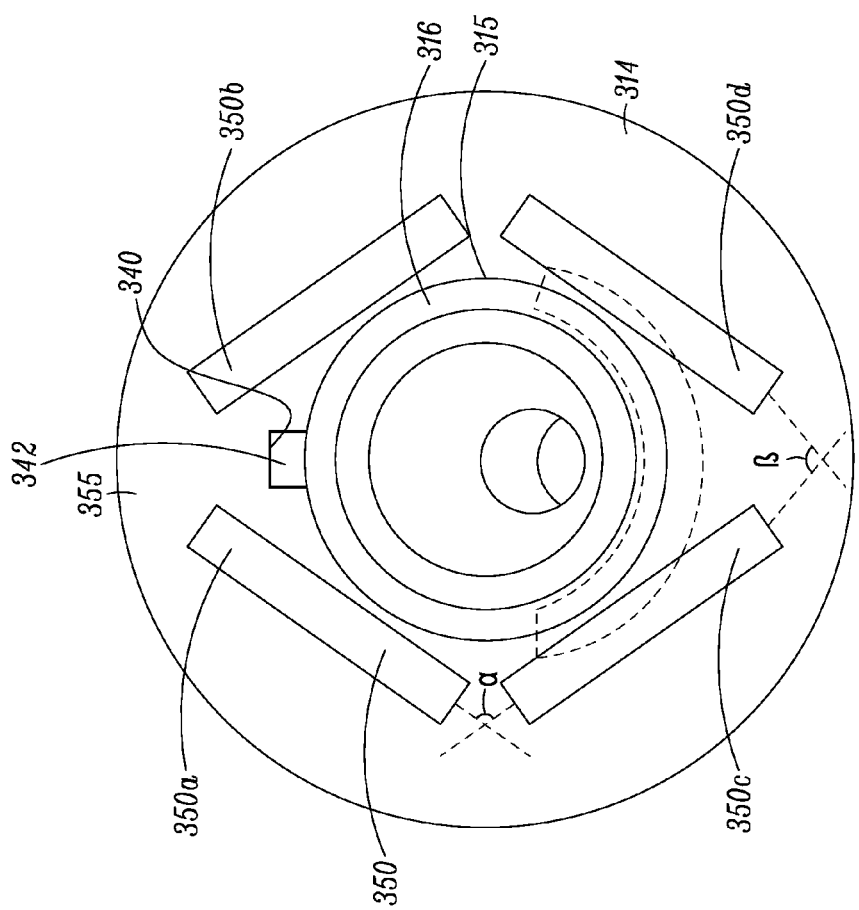

As illustrated in FIGS. 3A and 3B, the key way 340 is an extruded space from the center bore 315 along a length L3 of the center bore 315. A shape of the key 342 and a shape of the key way 340 may be configured to be complimentary, so that the key 342 can be fitted in the key way 340 along at least a portion of the length L3. The key 342 and the key way 340 may form a press fit to retain the shaft 316 with the rotor 314.

When assembling the motor 310, the key 342 of the shaft 316 can be aligned with the key way 340 of the rotor 314. The shaft 316 can then be pushed into the center bore 340 as the key 342 is pushed into the key way 340.

The shaft 316 can have a step 317 and the rotor 314 can have a shoulder 311. In the orientation as shown in FIG. 3A, the shaft 316 can be pushed into the center bore 315 from an upper side of the motor 310 toward a lower side of the motor 310 until the step 317 contacts the shoulder 311, thus prevents the shaft 316 from being pushed into the center bore 340 further.

A counter weight 330b can be fitted onto the shaft 316 from the lower side of the motor 310. The counter weight 330b and the shaft 316 can form a press fit. The press fit between the counter weight 330b and the rotor 314 and/or the contact between the shoulder 311 and the step 317 can help prevent the shaft from sliding relative to the shaft 316 (i.e. the direction defined by the length L3) as shown in FIG. 3A.

Figure 3C:
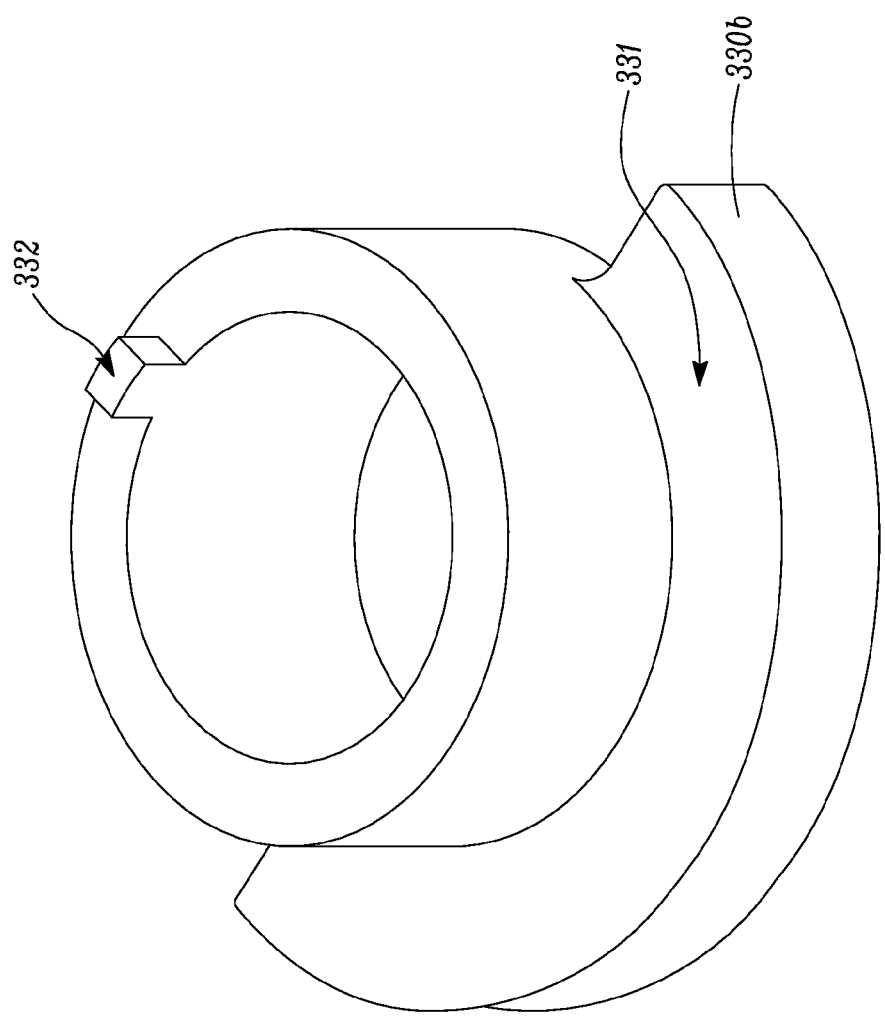

Referring to FIG. 3C, the counter weight 330b may have a balance mass portion 331, which can be configured to balance with the shaft 316 (as shown in FIG. 3A) during operation. The counter weight 330b may include an alignment tab 332. In some embodiments, the alignment tab 332 can be configured to fit into the key way 340 of the rotor 314. It will be appreciated that the aligned tab 332 can be inserted into other portions of the rotor 314 that is e.g. into a different radial portion.

The relative position of the alignment tab 332 and the balance mass portion 331 can be configured to help simplify the installation procedure of the counter weight 330b. Generally, referring back to FIG. 2, each of the first counter weight 230a and the second counter weight 230b may have a balance mass portion. Generally, the balance mass portion of the first counter weight 230a and the balance mass portion of the second counter weight 230b are about 180 degrees relative to each other. When the first and second counter weights 230a and 230b do not have the alignment tab, the relative position of the first and second weights 230a and 230b has to be adjusted after the counter weights 230a and 230b are disposed onto the shaft 216.

The alignment tab 332 can help position the counter weight 330b to a proper location relatively easily. Referring to FIGS. 3A and 3C, since the counter weight 330b has the alignment tab 332, the position of the counter weight 330b can be relatively easily determined by aligning the alignment tab 332 with the key way 340.

Referring back to 3B, one or more permanent magnets 350 can be embedded into the rotor 314. The permanent magnets 350 can be embedded into, for example, a lamination stack region 370 of the rotor 314. In the illustrated embodiment, the number of the permanent magnets 350 is four (permanent magnet 350a-d), with the understanding that the number of the permanent magnets 350 can be other numbers.

As illustrated, the permanent magnets 350a-d are configured so that an angle between two neighboring permanent magnets 350a-d is more or less than 90 degrees. For example, an angle α between the permanent magnets 350a and 350c is typically larger than 90 degrees, and an angle β between the permanent magnets 350c and 350d is typically less than 90 degrees. In some embodiments, the angle β between the permanent magnets 350c and 350d (as well as the angle between the permanent magnet 350a and 350b) is about 60-66 degrees. In some embodiments, the angle α between the permanent magnets 350b and 350d (as well as the angle between the permanent magnet 350a and 350c) is at least or about 114 degrees.

When the angle β between two neighboring permanent magnets 350c and 350d is less than 90 degree, the neighboring permanent magnets 350c and 350d can be separated by a relatively large portion 355 of the rotor 314, which may help accommodate the key way 340.

Figure 5A:
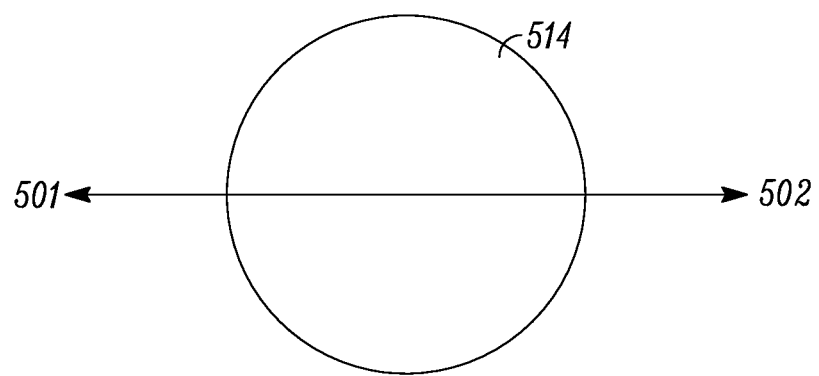
FIGS. 5A and 5B illustrate schematic views of a two pole permanent magnet motor.
Figure 5B:
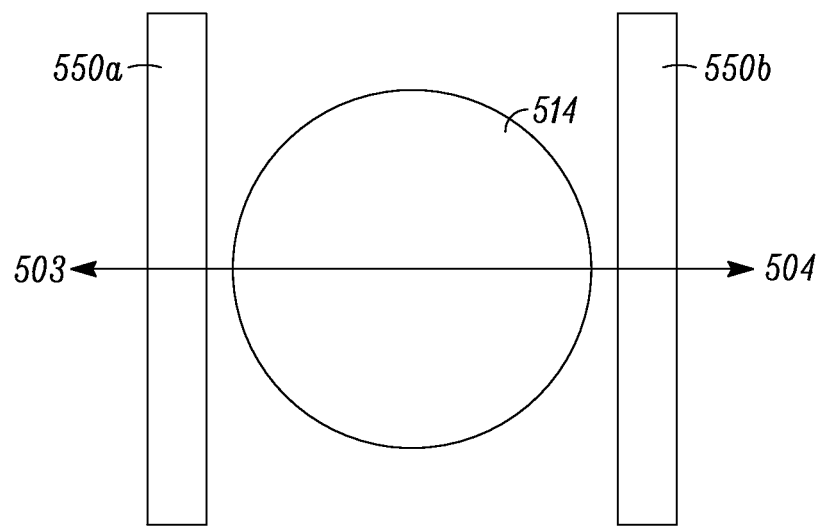

In some embodiments, the motor 310 can be a two pole motor. Generally, permanent magnets in a two pole motor can be arranged to help maximize magnetic flux in two opposite directions relative to the rotor. For example, as shown in FIG. 5A, permanent magnets can be arranged so that a first magnetic flux 501 and a second magnetic flux 502 are in opposite directions relative to each other across the rotor 514. In some embodiments, as shown in FIG. 5B, a motor can include two permanent magnets 550a, 550b positioned at opposite sides relative to a rotor 514 and are arranged parallel relatively to each other, so that a first magnetic flux 503 provided by the permanent magnet 550a and a second magnetic flux 404 provided by the permanent magnet 550b are opposite relative to each other.

Generally, when four permanent magnets, e.g. the four permanent magnets 350a-d, are used in a two pole motor, the permanent magnets can be configured to provide magnetic fluxes similar to what is illustrated in FIG. 5A. Two of the permanent magnets 350a-350d (e.g. the permanent magnets 350a and 350c, the permanent magnets 350b and 350d) can be positioned relatively close to each other to form two magnet groups, each of the magnet groups may provide a magnetic flux. The magnetic flux provided by each of the magnet groups may be in opposite direction relative to each other. The angle α can be configured to be as close to 180 degrees as possible so that each of the magnet groups may mimic an effect of one magnet (such as magnets 550a, 550b as illustrated in FIG. 5B). This configuration may help maximize the magnetic flux provided by each one of the magnet groups (e.g. the magnet group including permanent magnets 350a and 350c, and the magnet group including permanent magnets 350b and 350d).

Figure 3D:
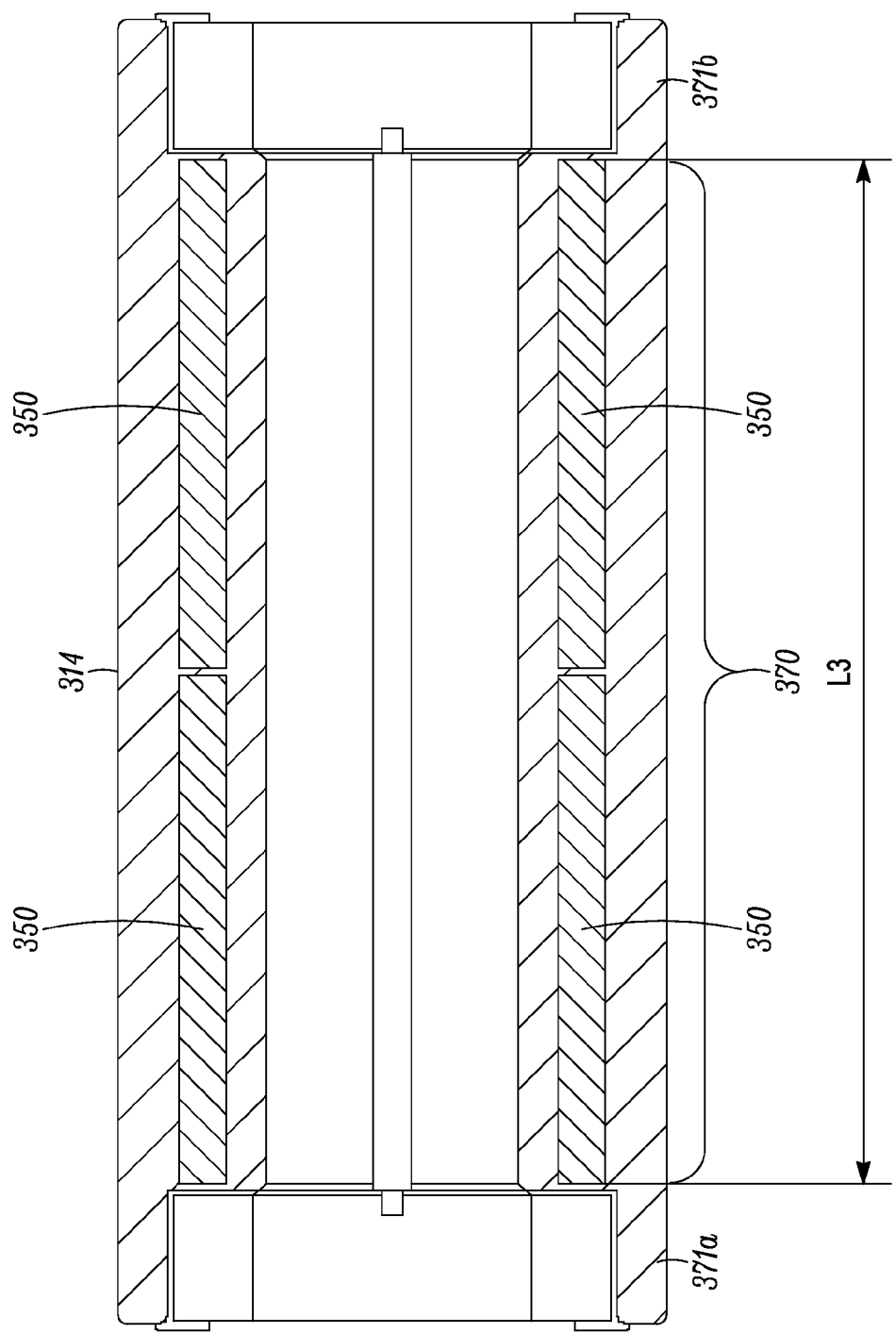

Referring to FIG. 3D, which illustrates a side sectional view of the rotor 314, the rotor 314 may include a lamination stack region 370 flanked by a first end portion 371a and a second end portion 371b. The lamination stack region 370 may generally include a plurality of laminations stacked together along the length L3. The first end portion 371a and second end portion 371b flanking the lamination stack region 370 can be configured to include a mechanism to help retain components, such as the counter weight 330b and/or the shaft 316. In the illustrated embodiment, the first and second ends portions 371a and 371b include a depression structure configured to receive the counter weight 330b. The center bore 315 goes through the entire lamination stack portion 370.

As illustrated in FIG. 3D, magnets 350 (e.g. the magnets 350a, 350b, 350c or 350d in FIG. 3B) can be embedded in the entire length (i.e. the length L3) of the laminated stack region 370. In the illustrated embodiments, two separated magnets 350 can be aligned in an end-to-end fashion along the length L3, with the appreciation that in some embodiments, the length of one magnet 350 may be about the entire length L3 of the laminated stack region 370. Using two separated magnets 350 may help with assembly of the rotor as the magnet 350 can be embedded into the laminated stack portion 370 from both the first end 371a and the second end 372b.

Referring to FIG. 3E, the lower portion of the motor 310 is illustrated. After assembly, the alignment tab 332 of the counter weight 330b is aligned with the key way 340. The counter weight 330b can be received by the bowl shaped second end 371b of the rotor 314. The counter weight 330b is retained on an end 316b of the shaft 316, and rests on the second end 371b of the rotor 314.

In some embodiments, the counter weight 330b may be made of material that includes iron. It is generally desirable that the iron containing counter weight 330b is not in contact with the permanent magnets 350 embedded in the rotor 314.

As illustrated in FIG. 3E, when the counter weight 330b rests on the second end 371b of the rotor 314, the counter weight 330b can be separated from the lamination stack region 370 by a space 360, which can help prevent the counter weight 330b from contacting the lamination stack region 370.

Figure 4:
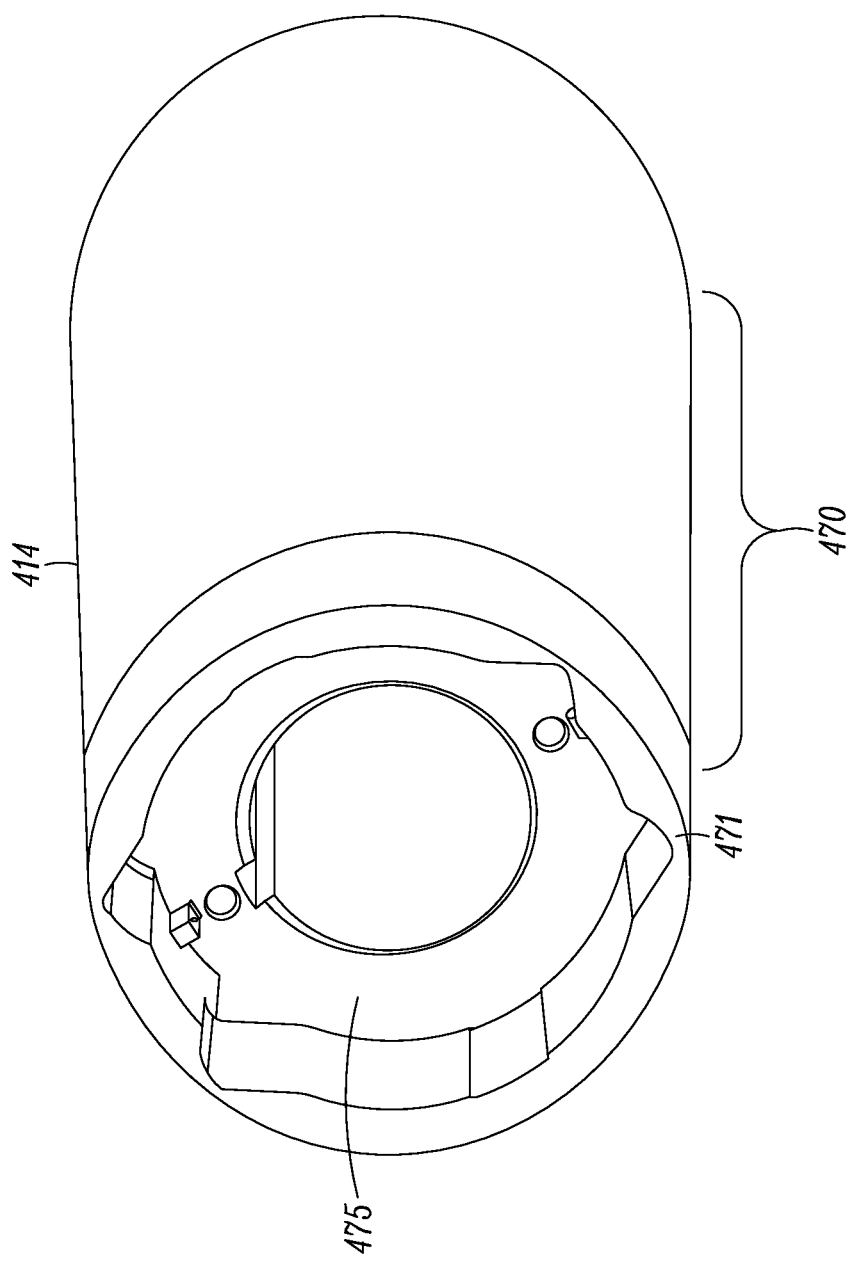
FIG. 4 illustrates a perspective view of a rotor of yet another embodiment of a motor.

In some other embodiments, as illustrated in FIG. 4, a lamination stack portion 470 of the rotor 414 can be covered by a separation sheet 475 from the end portion 471. The separation sheet 475 can be made of a non-magnetic containing material, such as plastic. Referring to FIG. 3E, the separation sheet 475 can be used to prevent the counter weight 330b from contacting the lamination stack portion 370 of the rotor 314 directly. With the separation sheet 475, the space 360 may not be needed.

ASPECTS

Any of aspects 1-7 can be combined with any of aspects 8-16. Any of aspects 8-14 can be combined with any of aspects 15-16.

Aspect 1. A compressor of a HVAC system, comprising:
a motor including a rotor, the rotor including a lamination stack portion;
a plurality of permanent magnets embedded in the lamination stack portion of the rotor;
a shaft;
a counter weight disposed on the shaft;
wherein the counter weight is separated from the permanent magnets, the rotor has a center bore with a shoulder, the shaft has a step, the shaft having a diameter that is larger than a diameter of the center bore, the step rests on the shoulder of the center bore, the counter weight and the step are positioned at opposite ends of the center bore, the counter weight has a press fit with the shaft, and the step and the counter weight retain the shaft in the center bore of the rotor.

Aspect 2. The compressor of aspect 1, wherein the center bore has a key way, the shaft has a key, and the key is fitted in the key way.

Aspect 3. The compressor of aspect 2, wherein the counter weight has an alignment tab, the alignment tab is positioned in the key way.

Aspect 4. The compressor of aspects 1-3, further comprising a separation sheet configured to separate the permanent magnets from the counter weight.

Aspect 5. The compressor of aspects 1-4, wherein the shaft and the center bore have a press fit.

Aspect 6. The compressor of aspect 5, wherein the shaft is shrink-fitted into the center bore.

Aspect 7. The compressor of aspects 1-6, wherein an angle between neighboring magnets of the plurality of permanent magnets is not equal to 90 degrees.

Aspect 8. A motor for a HVAC compressor, comprising:
a rotor, the rotor including a lamination stack portion;
a plurality of permanent magnets embedded in the lamination stack portion of the rotor;
a shaft;
a counter weight disposed on the shaft;
wherein the counter weight is separated from the permanent magnets, the rotor has a center bore with a shoulder, the shaft has a step, the step rests on the shoulder of the center bore, the counter weight and the step are positioned at opposite ends of the center bore, the counter weight has a press fit with the shaft, and the step and the counter weight retain the shaft in the center bore of the rotor.

Aspect 9. The motor of aspect 8, wherein the center bore has a key way, the shaft has a key, and the key is fitted in the key way.

Aspect 10. The motor of aspect 9, wherein the counter weight has an alignment tab, the alignment tab is positioned in the key way.

Aspect 11. The motor of aspects 8-10, further comprising a separation sheet configured to separate the permanent magnets from the counter weight.

Aspect 12. The motor of aspects 8-11, wherein the shaft and the center bore have a press fit.

Aspect 13. The motor of aspects 8-12, wherein the shaft has a diameter that is larger than a diameter of the center bore and the shaft is shrink-fitted into the center bore.

Aspect 14. The motor of aspects 8-13, wherein an angle between neighboring magnets of the plurality of permanent magnets is not equal to 90 degrees.

Aspect 15. A method of retaining a shaft in a rotor, comprising:
providing a shaft with a portion with a diameter that is larger than a diameter of a center bore of a rotor;
disposing a portion of the shaft into the center bore of the rotor until the portion with the diameter that is larger than the diameter of the center bore rests on a shoulder of the center bore; and
disposing a counter weight on the shaft from an end of the center bore that is opposite to the portion with the diameter that is larger than the diameter of the center bore until the counter weight rests on the rotor;
wherein the counter weight and the shaft have a press fit.

Aspect 16. The method of aspect 15, wherein disposing a portion of the shaft into the center bore of the rotor includes shrink-fitting the shaft into the center bore.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

The invention claimed is:

1. A compressor of a heating, ventilation, and air conditioning (HVAC) system, comprising:
a motor including a rotor, the rotor including a lamination stack portion;
a plurality of permanent magnets embedded in the lamination stack portion of the rotor;
a shaft;
a counter weight disposed on the shaft;
wherein the counter weight is separated from the permanent magnets, the rotor has a center bore with a shoulder, the shaft has a step, the shaft having a diameter that is larger than a diameter of the center bore, the step rests on the shoulder of the center bore, the counter weight and the step are positioned at opposite ends of the center bore, the counter weight has a press fit with the shaft,
wherein the center bore has a key way, the shaft has a key, and the key is fitted in the key way, and
wherein the counter weight has an alignment tab, the alignment tab is fitted into the key way.

2. The compressor of claim 1, further comprising a separation sheet configured to separate the permanent magnets from the counter weight.

3. The compressor of claim 1, wherein the shaft and the center bore have a press fit.

4. The compressor of claim 1, wherein the shaft is shrink-fitted into the center bore.

5. The compressor of claim 1, wherein an angle between neighboring magnets of the plurality of permanent magnets is not equal to 90 degrees.

6. The compressor of claim 1, wherein the angle between neighboring magnets of two of the plurality of permanent magnets is greater than 90 degrees and the angle between two others of the plurality of permanent magnets is less than 90 degrees.

7. The compressor of claim 1, wherein the rotor abuts the counter weight.

8. A motor for a heating, ventilation, and air conditioning (HVAC) compressor, comprising:
   a rotor, the rotor including a lamination stack portion;
   a plurality of permanent magnets embedded in the lamination stack portion of the rotor;
   a shaft;
   a counter weight disposed on the shaft;
   wherein the counter weight is separated from the permanent magnets, the rotor has a center bore with a shoulder, the shaft has a step, the step rests on the shoulder of the center bore, the counter weight and the step are positioned at opposite ends of the center bore, the counter weight has a press fit with the shaft,
   wherein the center bore has a key way, the shaft has a key, and the key is fitted in the key way, and
   wherein the counter weight has an alignment tab, the alignment tab is fitted into the key way.

9. The motor of claim 8, further comprising a separation sheet configured to separate the permanent magnets from the counter weight.

10. The motor of claim 8, wherein the shaft and the center bore have a press fit.

11. The motor of claim 8, wherein the shaft has a diameter that is larger than a diameter of the center bore and the shaft is shrink-fitted into the center bore.

12. The motor of claim 8, wherein an angle between neighboring magnets of the plurality of permanent magnets is not equal to 90 degrees.

13. The motor of claim 8, wherein the angle between neighboring magnets of two of the plurality of permanent magnets is greater than 90 degrees and the angle between two others of the plurality of permanent magnets is less than 90 degrees.

14. The motor of claim 8, wherein the rotor abuts the counter weight.

15. A method of retaining a shaft in a rotor, comprising:
   providing a shaft with a portion with a diameter that is larger than a diameter of a center bore of a rotor;
   disposing a portion of the shaft into the center bore of the rotor until the portion with the diameter that is larger than the diameter of the center bore rests on a shoulder of the center bore;
   disposing a counter weight on the shaft from an end of the center bore that is opposite to the portion with the diameter that is larger than the diameter of the center bore;
   fitting a key on the shaft in a key way of the center bore; and
   fitting an alignment tab of the counter weight into the key way,
   wherein the counter weight and the shaft have a press fit.

16. The method of claim 15, wherein disposing a portion of the shaft into the center bore of the rotor includes shrink-fitting the shaft into the center bore.

17. The method of claim 15, wherein disposing the counter weight on the shaft from the end of the center bore that is opposite to the portion with the diameter that is larger than the diameter of the center bore includes abutting the counter weight and the rotor.

* * * * *